No. 675,760. Patented June 4, 1901.
C. UEBEL.
APPARATUS FOR MAKING NITRIC ACID.
(Application filed Jan. 21, 1901.)
(No Model.) 2 Sheets—Sheet 1.

No. 675,760. Patented June 4, 1901.
C. UEBEL.
APPARATUS FOR MAKING NITRIC ACID.
(Application filed Jan. 21, 1901.)

(No Model.) 2 Sheets—Sheet 2.

UNITED STATES PATENT OFFICE.

CARL UEBEL, OF AACHEN, GERMANY, ASSIGNOR TO CHEMISCHE FABRIK RHENANIA, OF SAME PLACE.

APPARATUS FOR MAKING NITRIC ACID.

SPECIFICATION forming part of Letters Patent No. 675,760, dated June 4, 1901.

Application filed January 21, 1901. Serial No. 44,172. (No model.)

*To all whom it may concern:*

Be it known that I, CARL UEBEL, a citizen of Germany, residing at Aachen, in the Empire of Germany, have invented certain new and useful Improvements in Apparatus for the Manufacture of Nitric Acid, (for which application has been made for a patent in Germany, dated March 10, 1900,) of which the following is a specification.

This invention relates to an apparatus for the manufacture of nitric acid in which two retorts, side by side, are alternately charged and when nearly all the nitric acid has distilled are emptied into a third retort situated below them. The lower retort is heated directly by the fire and is kept at a constant temperature of from 280° to 300° centigrade to expel the last portion of nitric acid and water and to supply the heat required to dehydrate the polysulfate afterward to be formed. The upper retorts, in which only the decomposition of the saltpeter is effected, are heated to between 170° and 200° centigrade by being alternately subjected to the fire-gases from the furnace of the lower retort. The hot bisulfate from the lower retort is withdrawn into a cast-iron pan in front of the retort and containing the calculated proportion of sulfuric acid of 60° Baumé specific gravity, preferably previously warmed. In this manner the water in the sulfuric acid is evolved and is led away through a hood. One-half of the polysulfate thus produced is transferred to one of the upper retorts for the decomposition of a fresh charge of saltpeter. If there is no other use for polysulfate, the production of an excess may be avoided by treating only half of the bisulfate from the lower retort with sulfuric acid and setting aside the remainder for use in other ways.

Figure 1:
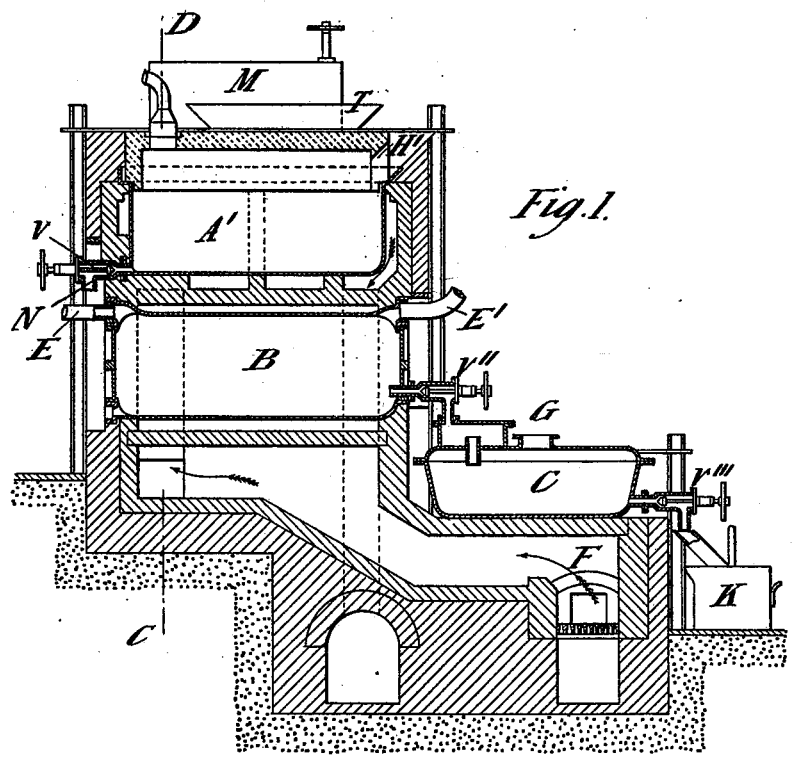
Figure 3:
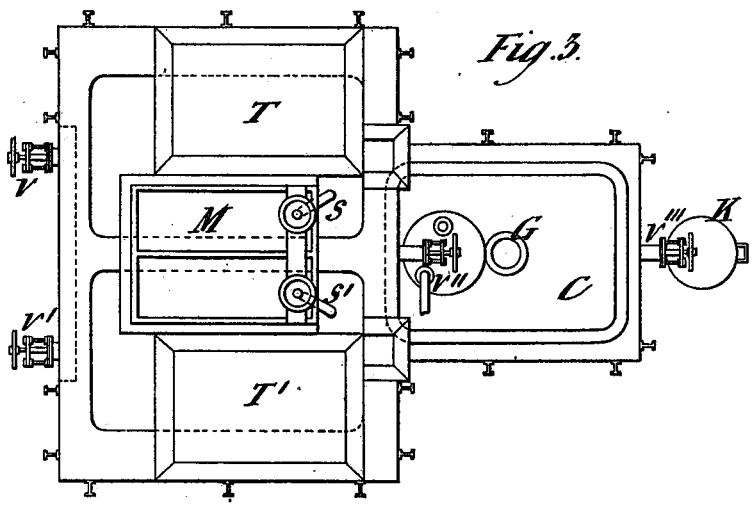
Figure 2:
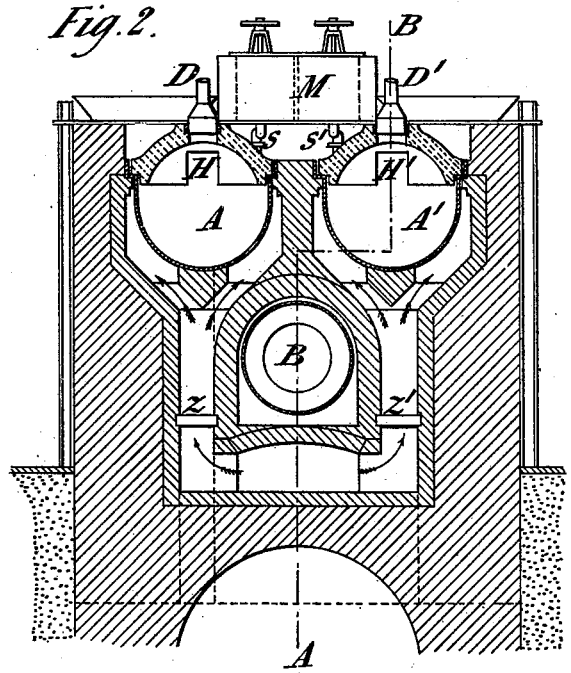
Figure 4:
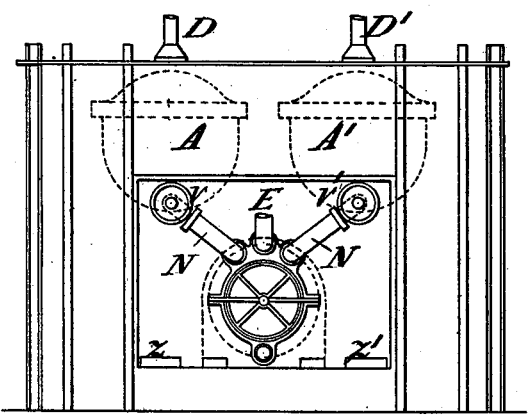

In the accompanying drawings, Figure 1 is a vertical longitudinal section on line A B of Fig. 2, which is a section on line C D of Fig. 1, and Fig. 3 is a plan of an apparatus constructed in accordance with this invention. Fig. 4 is an end view of the back of the furnace and retorts.

A A' are the upper retorts, provided with charging-openings H H', and pipes D D' for escape of acid-vapor.

B is the lower retort, set in the main flue of the furnace F. This main flue is branched on each side, and each branch has a damper $z\ z'$, by which the fire-gases may be cut off from the top retorts, which are situated in extensions of these branches. Each upper retort has a valve $v\ v'$, which closes a pipe N, leading into the lower retort. The latter has two pipes E E' for escape of vapor and a valve $v^2$, through which the molten bisulfate is withdrawn into pan C. This pan has an opening G for escape of vapor and a valve $v^3$ for allowing the polysulfate to flow into a bucket K. For feeding the polysulfate into the retorts A A' there is provided a tank M, from which siphon-trap pipes $s\ s'$ lead to the respective retorts.

T T' are pans for drying saltpeter.

The apparatus is worked as follows: The fire having been lighted, one of the upper retorts—say A—receives through opening H a charge of saltpeter, which may be first dried in the flat pans T T' on the cover of the furnace. The charge having been spread out in the retort the opening H is closed by a well-fitting cover, made tight by casting saltpeter around it. Fused polysulfate is now gradually run into the retort through the siphon-trap pipe $s$, either directly from the bucket K or from the measuring-tank M. When the apparatus is started and there is no polysulfate on hand, sulfuric acid must be used instead for the first charge. The hot polysulfate, the temperature of which is between 120° and 150° centigrade, must be slowly run into the saltpeter to avoid too rapid distillation of nitric acid. According to the size of the charge the operation should occupy from one-half to one hour, during which time the damper $z$ is closed and $z'$ open. The retort A is next heated up by opening damper $z$, and when its contents have attained a temperature of about 170° centigrade nearly all the nitric acid has distilled over and the fully-molten liquid contains only a small quantity of this acid and water, the amount of the latter depending on the moisture in the saltpeter and the water in the polysulfate. The contents of A are now allowed to flow slowly through valve $v$ into the lower retort B. The valve $v^2$ is at such a height that B can never be quite empty, but always contains a small quantity of bisulfate heated to about 300° centigrade. By introducing the residue from the upper retort, which is heated only to 170° to 180° centigrade, into the hot bisulfate in the lower retort it is possible to expel all the nitric acid and water still in the mass in a short time without the troublesome frothing which occurs when the retort is fired directly, as in the old process. The residue from A remains in B until the charge which has been introduced in the meantime into A' has been so far heated that it is ready to be run into B. This time will be some three and one-half to four hours, after which the bisulfate in retort B is run, together with the measured quantity of sulfuric acid of 60° Baumé specific gravity or waste acid, into the pan C. The retort B is then ready for the residue from A'. After retort A has been allowed to remain to cool for about one hour with damper $z$ closed it is recharged, the polysulfate in the pan C being for this purpose withdrawn into bucket K and raised to the retort by suitable means. The operations already described are then repeated, each upper retort being recharged about every four hours.

When it is not necessary to manufacture exclusively the most concentrated nitric acid or where highly-concentrated sulfuric acid is not essentially dearer than that which is less concentrated, sulfuric acid may be used instead of polysulfate in this apparatus with the same economy, in which case the production of polysulfate in pan C and the pan itself are not required.

Having thus described the nature of this invention and the best means I know of carrying the same into practical effect, I claim—

An apparatus for the manufacture of nitric acid consisting of a furnace including a main flue having a plurality of separate branches, a retort in said main flue and a plurality of retorts mounted in the respective branches and communicating with said first retort.

In testimony whereof I have hereunto set my hand in presence of two subscribing witnesses.

CARL UEBEL.

Witnesses:
 ROBERT HASEMBORN,
 C. E. BRUNDAGE.